Oct. 28, 1924.
I. T. BENNETT ET AL
1,512,973
CRANK SHAFT OR THE LIKE
Filed Feb. 28, 1924    2 Sheets—Sheet 1
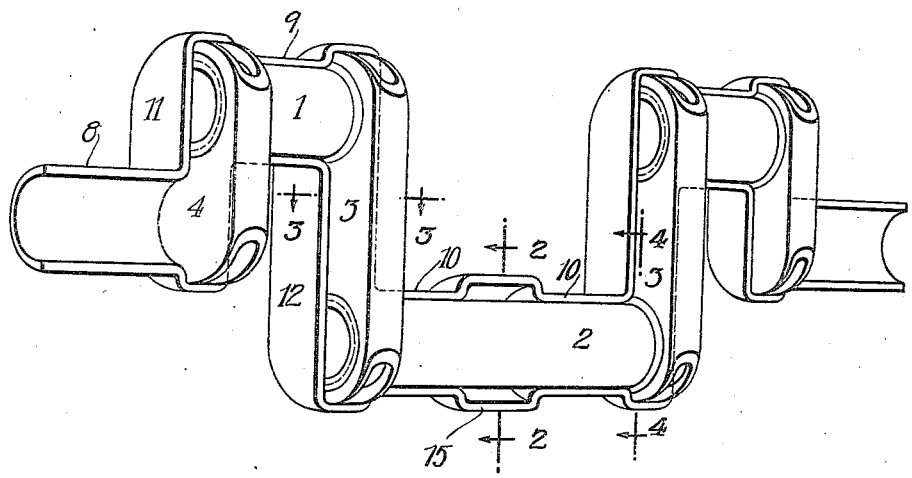
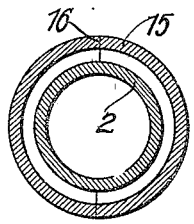
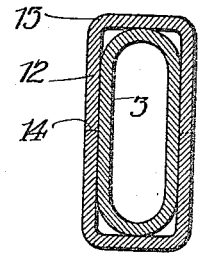
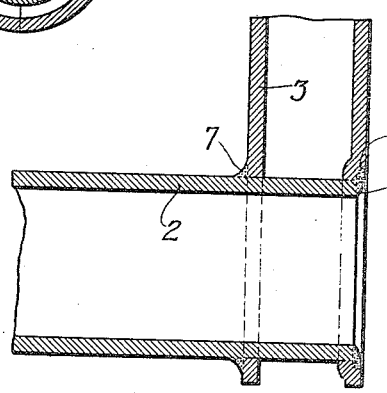
INVENTOR.
IRVING T. BENNETT.
BY GEORGE H. PHELPS.
ATTORNEY.

Oct. 28, 1924.
I. T. BENNETT ET AL
1,512,973
CRANK SHAFT OR THE LIKE
Filed Feb. 28, 1924    2 Sheets-Sheet 2
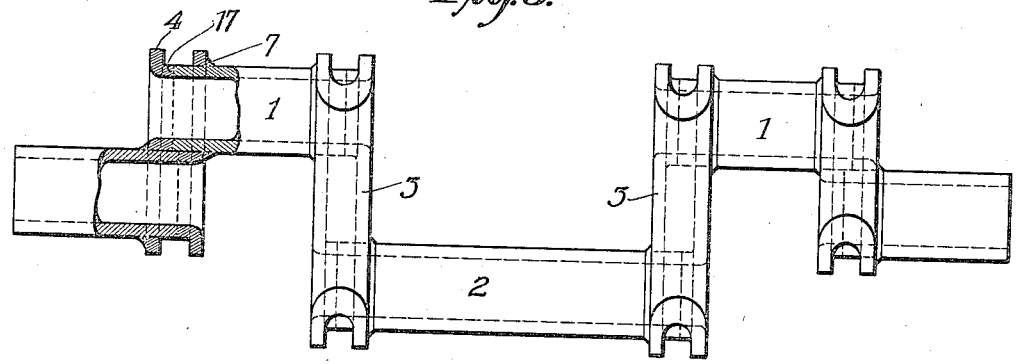
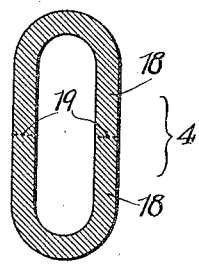
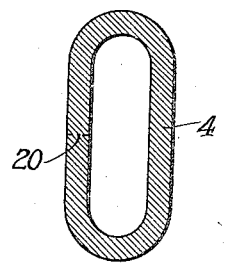
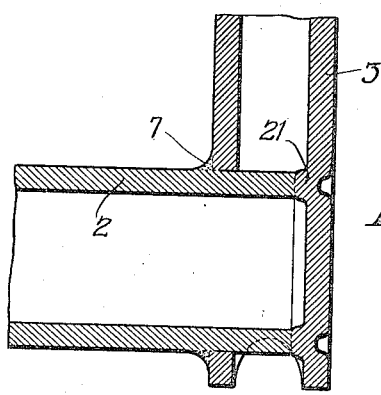
INVENTOR.
IRVING T. BENNETT, and
BY GEORGE H. PHELPS.
ATTORNEY.

Patented Oct. 28, 1924.

1,512,973

UNITED STATES PATENT OFFICE.

IRVING T. BENNETT, OF BROOKLYN, NEW YORK, AND GEORGE H. PHELPS, OF WAREHOUSE POINT, CONNECTICUT, ASSIGNORS TO THOMAS E. MURRAY, OF BROOKLYN, NEW YORK.

CRANK SHAFT OR THE LIKE.

Application filed February 28, 1924. Serial No. 695,625.

*To all whom it may concern:*

Be it known that we, IRVING T. BENNETT and GEORGE H. PHELPS, citizens of the United States, and residents, respectively, of Brooklyn, New York, and Warehouse Point, Connecticut, have invented certain new and useful Improvements in Crank Shafts or the like, of which the following is a specification.

The invention aims to provide certain improvements by which such shafts can be made economically and of the necessary strength. The accompanying drawings illustrate embodiments of the invention.

Fig. 1 is a perspective view of one half of an outer shell in position on an inner reinforcement, in the making of a crank shaft for a four-cylinder automobile engine;

Figs. 2 and 3 are cross-sections on the corresponding lines of Fig. 1;

Fig. 4 is a longitudinal section of a detail;

Fig. 5 is a side elevation, partly in section, of a complete reinforcement for a similar shaft, or it may represent the finished shaft;

Figs. 6 and 7 are cross-sections illustrating alternative crank arms;

Fig. 8 is a longitudinal section of an alternative style of joint.

Referring to Fig. 1, the shaft is made of an outer shell surrounding an inner reinforcement. The reinforcement comprises circular tubular bearing portions 1 and 2 connected by crank portions 3. On the outer ends of the bearing portions 1 are shorter crank portions 4. On the lower ends of the latter there may be mounted also circular portions, similar to 1 and 2 and of any desired length, or this reinforcement may be omitted from the end bearings as in the drawings. The bearing portions are circular. The crank arms are preferably oblong in cross-section with their greatest dimension transverse to the axis of the shaft for greater strength in this direction. The parts described may be made of seamless tubing or of sheet metal bent into segments and welded at the edges, or of tubing welded along a single edge; as described in connection with Figs. 6 and 7.

The crank arms extend lengthwise beyond the bearing portions and are wider than the latter and a strong joint is made by passing the ends of the bearing portions through the crank arms and welding the two together. See Fig. 4. The bearing member passes through the walls of the crank member. The latter has its outer wall recessed at 5 to receive a quantity of arc-deposited metal 6 by which the two are welded together. Preferably also they are welded where the bearing member passes through the inner wall of the crank member, as by arc-deposited metal 7.

The structure thus described may be used as a complete shaft, using sufficiently heavy metal for the purpose. Or it may be used as an inner reinforcement for an outside shell as in Figs. 1, 2 and 3. The outer shell is made of two segments similar to the one shown in Fig. 1, and comprising end bearing portions 8, short outer bearing portions 9 and intermediate bearing portions 10 connected by segments of short crank portions 11 and long crank portions 12. The edges of such segments are in the plane of the centers of the several bearings. Two such segments are made and brought together about the inner reinforcement and butt-welded together.

For greater stiffness of the crank portions the segments thereof may extend beyond the reinforcement at the corners 13, Fig. 3. They embrace the reinforcement closely at the sides and ends, however. The welded joints are indicated at 14.

The central long bearing member may be stiffened at the middle by a similar expedient, providing the outer shell with a central enlargement 15 beyond the reinforcement 2. See Fig. 2. The welded joint is indicated at 16.

Fig. 5 shows an alternative construction which may be used either as an inner reinforcement as in Fig. 1, or without an outer shell. The joint between the parts is made by bending a flange 17 inward from the outer wall of the crank member and butt-welding the same to the end of the bearing member; a reinforcement 7 of arc welding being preferably added where the one member passes through the wall of the other.

According to Fig. 6, the crank member 4, for example, is made of two identical segments 18 brought together at their edges and welded as at 19.

According to Fig. 7 a single blank of sheet metal is bent up and its edges brought together and butt-welded at 20. Or a butt-welded or lap-welded tube of other cross-section is bent to the oblong shape desired.

The ends of the hollow crank arms may be closed, and likewise their side walls where joined to the bearing members. For example, Fig. 8 illustrates a construction in which the outer wall of the crank member 3 is pressed to form a circular rib 21 on its inner face which is butt-welded to the end of the bearing member 2.

Though we have described with great particularity of detail certain embodiments of our invention, yet it is not to be understood that the invention is limited to the embodiments described. Various modifications may be made by those skilled in the art without departure from the invention as defined in the following claims.

What we claim is:

1. A crank shaft or the like comprising an outer shell and an inner reinforcement, each including bearing portions and crank portions, said shell and reinforcement each being made of parts welded together, the joints of the one being transverse to those of the other.

2. A crank shaft or the like comprising an outer shell and an inner reinforcement, each including bearing portions and crank portions, said shell and reinforcement each being made of parts welded together, the joints of the reinforcement being transverse to the axis of the shaft and the joints of the shell being parallel thereto.

3. A crank shaft or the like comprising an outer shell made of longitudinal segments welded together and an inner reinforcement made of tubular bearing portions and hollow crank portions with their bores transverse to the axis of the shaft, the ends of the bearing portions being welded to the crank portions near the ends of the latter.

4. A crank shaft or the like comprising tubular bearing portions and hollow crank portions with their bores transverse to the axis of the shaft, the ends of the bearing portions passing through one wall of the adjoining crank portions and welded to the opposite wall thereof.

5. A crank shaft or the like comprising an outer shell made of longitudinal segments welded together and an inner reinforcement made of tubular bearing portions and hollow crank portions formed of sheet metal bent to the desired hollow shape in cross-section, the ends of the bearing portions being welded to the crank portions.

In witness whereof, we have hereunto signed our names.

IRVING T. BENNETT.
GEORGE H. PHELPS.